Patented Apr. 4, 1944

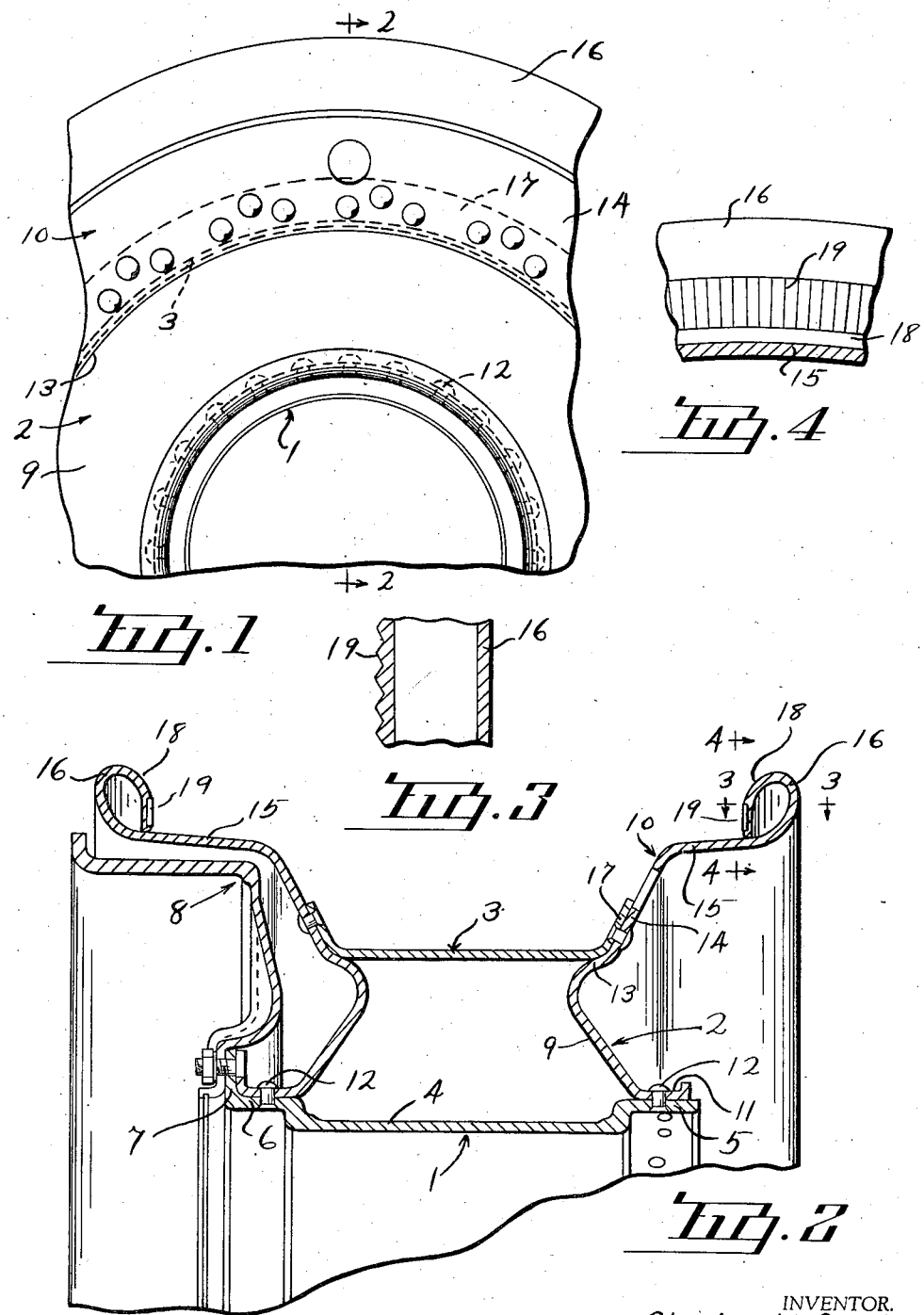

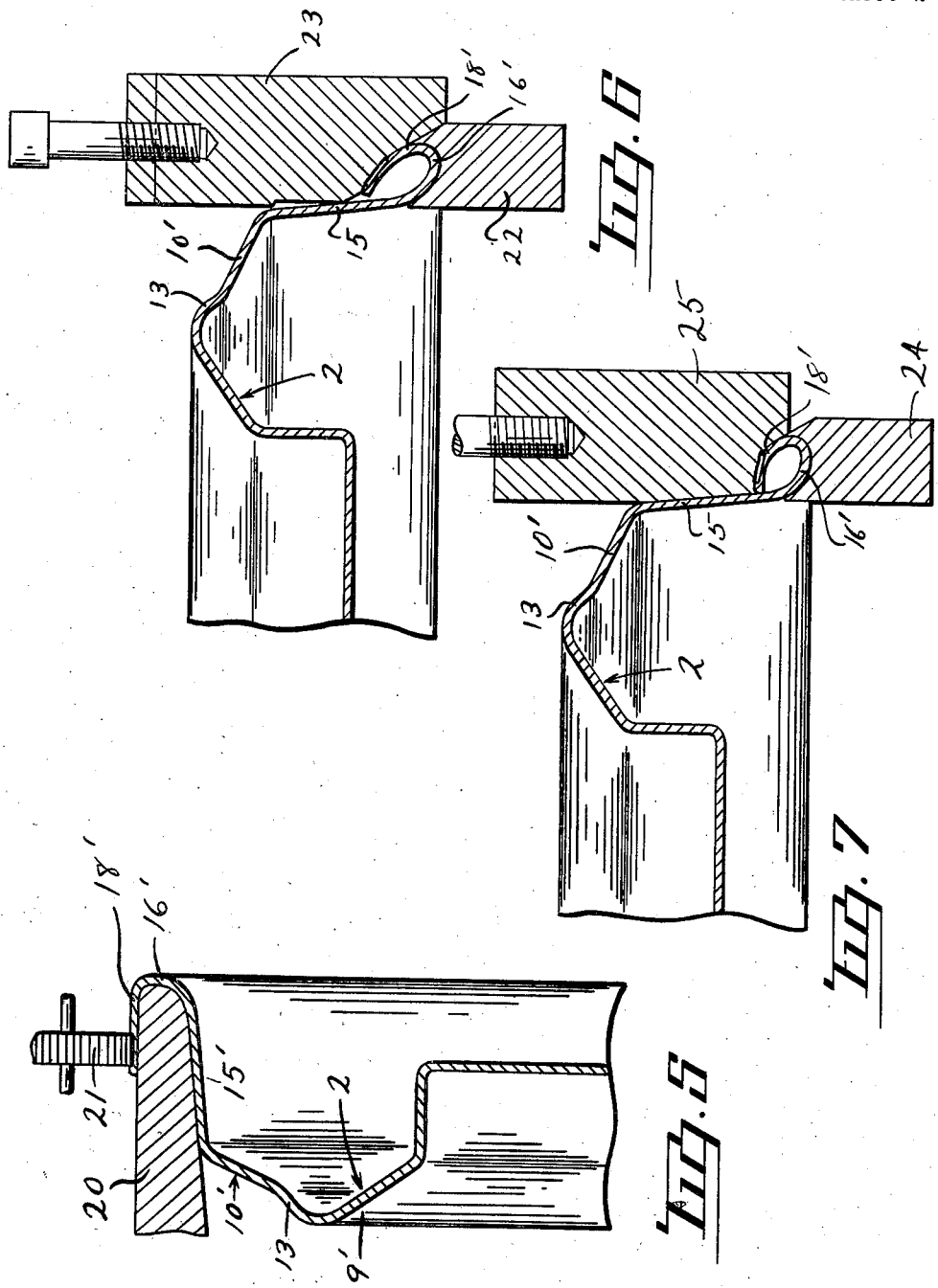

2,345,993

UNITED STATES PATENT OFFICE 2,345,993

MANUFACTURE OF WHEELS

Charles W. Sinclair, Detroit, Mich., assignor to Kelsey-Hayes Wheel Company, Detroit, Mich., a corporation of Delaware Application January 2, 1942, Serial No. 425,473

2 Claims. (Cl. 29—159.1)

The invention relates to the manufacture of wheels and more particularly wheels of that type adapted to receive tires of relatively large cross section.

The invention has for one of its objects to provide an improved method of forming a steel wheel of the type in question so that it has substantially the strength and weight of a wheel made of aluminum or an aluminum alloy of the same type and size.

The invention has for another of its objects to provide an improved method of forming the wheel tire carrying rim with tire anti-creeping means and more particularly a tire retaining flange of the rim with serrations to prevent creeping of the tire.

With these as well as other objects in view, the invention resides in the novel manufacturing steps as more fully hereinafter set forth.

In the drawings—

Figure 1 is an elevation of a portion of a wheel manufactured in accordance with the method embodying the invention;

Figure 2 is a cross section on the line 2—2 of Figure 1;

Figures 3 and 4 are cross sections on the lines 3—3 and 4—4, respectively, of Figure 2;

Figures 5, 6 and 7 are views similar to Figure 2 illustrating different steps in the method of manufacture.

The wheel is designed particularly for use on airplanes and, as illustrated in Figures 1, 2, 3 and 4, the wheel comprises the hub 1, the combined rim and wheel body elements 2, and the annulus 3.

The hub 1 is formed of steel and preferably from a circular sheet steel blank by a series of drawing and upsetting and machining steps. The hub is tubular and has the reduced central portion 4 and the enlarged end portions 5 and 6 with the latter terminating in a radially outwardly extending annular flange 7 to which the brake drum 8 is secured.

Each of the combined rim and wheel body elements 2 is preferably formed by die-pressing flat circular sheet metal blanks preferably formed of steel and comprises the body portion 9 and the integral rim portion 10. Each body portion has its central axial part 11 fixedly secured to an enlarged end portion of the hub by suitable means, such as the rivets 12. The body portions converge radially outwardly from their central axial parts and are axially spaced from each other at their peripheral parts. The rim portions diverge radially outwardly from the peripheral parts of the body portions and each rim portion is formed with a generally axial base 13 extending outwardly from the associated peripheral part of the body portion, a radially and axially outwardly inclined side wall 14 extending from the base, a generally axially extending tire bead seat 15 extending from the side wall and a tire retaining flange 16 extending from the bead seat. The base 13 is curved to substantially form a continuation of the curve at the peripheral part of the body portion 9, the curve being gradual. The bead seat 15 is preferably inclined at an acute angle to the horizontal, the angle being preferably 5 degrees. The tire retaining flange 16 is return-bent to form a closed hollow bead which is located axially outwardly beyond the central axial part 11 of the body portion of the same element.

The annulus 3 is made of sheet steel and endless. The annulus has upwardly diverging flanges 17 fitting and fixedly secured to the side walls 14 of the rim portions as by means of rivets. The annulus further has curved junctions between its side flanges and base which fit and rest on the bases 13. The annulus cooperates with the rim portions 10 to form a drop-center tire carrying rim, the annulus with the side walls 14 forming the well of the rim.

To prevent creeping of the tire on the rim, the inturned generally radially extending terminal portion 18 of the bead 16 of each rim portion is formed with the radial serrations 19 which preferably terminate a short distance from the edge of the terminal portion and the associated generally axially extending bead seat 15 of the rim portion.

In the manufacture of the wheel, the combined rim and wheel body elements 2 and the annulus 3 are formed separately. Each combined rim and wheel body element is progressively formed from a flat circular steel blank by a series of die-pressing steps into the blank illustrated in Figure 5 having the body forming portion 9' and the integral rim forming portion 10'. The rim forming portion has the part 16' which extends generally radially outwardly from the bead seat forming part 15' and the terminal forming part 18' which extends generally axially from the part 16' over the part 15'. While the part 18' is held in its generally axial position and supported by the annular internal back-up die 20, the serrations 19 are formed by rolling the knurling tool 21 over an intermediate portion of the part 18' in an annular zone between the edges of the part. Figure 5 illustrates the knurling step.

After the serrations have been formed the terminal forming part is progressively bent radially inwardly by a series of die-pressing steps, as illustrated in Figures 6 and 7, to its final position completing the forming of the closed hollow bead. Figure 6 illustrates the first die-pressing step in which the part 16' is backed up by the die 22 while the die 23 is moved axially of the blank toward the die 22 to exert a combined axial and radially inward pressure on the part 18', the free edge portion of this part being subjected to the greatest stress. Figure 7 illustrates the second die-pressing step in which the part 16' is backed up by the die 24, while the die 25 is moved axially of the blank toward the die 24 to exert a combined axial and radially inward pressure on the part 18', the radial pressure being relatively small. During this second die-pressing step the free edge portion of the terminal forming part is also subjected to the greatest stress. The free edge is preferably formed with a radius to facilitate the proper forming of the hollow bead.

With the method as illustrated in Figures 5, 6 and 7, the serrations and the hollow beads of the tire retaining flanges can be readily and economically formed and in a manner such that the serrations are not damaged or destroyed.

Then the steps of removing the central portion of the blank and completing the formation of the central part of the body portion by die-pressing, and finally the forming of rivet holes as by drilling, are carried out, after which the completed rim and wheel body element is ready for assembly. The annulus is preferably formed from a flat steel blank by hooping the same, welding its ends, and sizing, the diverging side flanges being preferably fashioned by die-pressing.

What I claim as my invention is:

1. In the method of forming a tire carrying rim, the forming of a sheet metal annular blank having an annular bead seat forming part, a second part extending generally radially outwardly from the first mentioned part, and an annular third part extending substantially axially from the second part over the first mentioned part, the transverse knurling of the radially outer surface of the third part while supporting the same, and then the bending radially inwardly of the knurled third part about the second part and over the first mentioned part to form a tire retaining bead on the rim with the knurled surface on the tire engaging side of the bead.

2. In the method of forming a tire carrying rim, the forming of a sheet metal annular blank having a generally axially extending annular bead seat forming part, a second part extending generally radially outwardly from the first mentioned part, and an annular third part extending generally axially from the second part over the first mentioned part, the transverse knurling of the radially outer surface of the third part in an annular zone spaced from its free edge, and then the die-pressing of the knurled third part with its free edge subjected to the greatest stress to bend the third part radially inwardly about the second part and over the first mentioned part and thereby form a hollow tire retaining bead with the knurled zone spaced radially outwardly from the first mentioned part and in a position to engage a tire.

CHARLES W. SINCLAIR.